United States Patent
Sibert

(10) Patent No.: US 8,543,839 B2
(45) Date of Patent: Sep. 24, 2013

(54) ELECTRONIC DEVICE AND METHOD OF SOFTWARE OR FIRMWARE UPDATING OF AN ELECTRONIC DEVICE

(75) Inventor: Hervé Sibert, Le Mans (FR)

(73) Assignee: ST-Ericsson SA, Plan-les-Ouates (CH)

( * ) Notice: Subject to any disclaimer, the term of this patent is extended or adjusted under 35 U.S.C. 154(b) by 173 days.

(21) Appl. No.: 12/976,857

(22) Filed: Dec. 22, 2010

(65) Prior Publication Data

US 2011/0208975 A1     Aug. 25, 2011

Related U.S. Application Data

(63) Continuation of application No. PCT/EP2009/057455, filed on Jun. 16, 2009.

(30) Foreign Application Priority Data

Jun. 23, 2008    (EP) .................................. 08290596

(51) Int. Cl.
*H04L 29/06*     (2006.01)

(52) U.S. Cl.
USPC ............. 713/193; 713/189; 726/26; 707/638; 705/51; 705/58; 705/59; 717/170

(58) Field of Classification Search
USPC ........................................................ 713/193
See application file for complete search history.

(56) References Cited

U.S. PATENT DOCUMENTS

| | | | | |
|---|---|---|---|---|
| 5,138,712 A | * | 8/1992 | Corbin ............................ | 726/30 |
| 6,006,034 A | * | 12/1999 | Heath et al. .................... | 717/170 |
| 6,468,160 B2 | * | 10/2002 | Eliott ............................. | 463/43 |
| 6,496,978 B1 | * | 12/2002 | Ito ................................. | 717/170 |

(Continued)

FOREIGN PATENT DOCUMENTS

| | | |
|---|---|---|
| GB | 2425193 | 10/2006 |
| GB | 2430774 | 8/2007 |
| WO | 2004/021178 | 3/2004 |

OTHER PUBLICATIONS

Engel, Dominik; Stutz, Thomas; Uhl, Andreas. Efficient Transparent JPEG2000 Encryption with Format-Compliant Header Protection. IEEE International Conference on Signal Processing and Communications. Pub. Date: 2007. Relevant pp. 1067-1070. Found on the World Wide Web: http://ieeexplore.ieee.org/stamp/stamp.jsp?tp= &arnumber=4728507.*

*Primary Examiner* — Nathan Flynn
*Assistant Examiner* — Jeremiah Avery
(74) *Attorney, Agent, or Firm* — Potomac Patent Group, PLLC

(57) ABSTRACT

An electronic device is provided having a memory driver unit for reading partition headers including encrypted version numbers from a memory and for writing updated encrypted version numbers to the memory. The electronic device has an update agent unit for controlling a software or firmware update, a one-time programmable memory for storing a first value, and an encrypt-decrypt unit for decrypting the partition headers stored in the memory. The update agent is configured to compare the retrieved version numbers with a version number from a software or firmware update. The first value is incremented and stored in the one-time programmable memory if an update is performed. The encrypt-decrypt unit is configured to encrypt the version numbers of the software or firmware update based on the new first value. The memory driver unit is configured to write a new partition header with the updated encrypted version numbers into the memory.

20 Claims, 2 Drawing Sheets

(56) References Cited

U.S. PATENT DOCUMENTS

| | | | |
|---|---|---|---|
| 7,260,555 B2* | 8/2007 | Rossmann et al. | 705/51 |
| 7,342,966 B2* | 3/2008 | Lepine et al. | 375/240.24 |
| 7,379,549 B2* | 5/2008 | Pelly et al. | 380/278 |
| 7,681,031 B2* | 3/2010 | Matusz et al. | 713/151 |
| 7,681,034 B1* | 3/2010 | Lee et al. | 713/164 |
| 7,729,995 B1* | 6/2010 | Alain et al. | 705/71 |
| 7,913,311 B2* | 3/2011 | Alain et al. | 726/28 |
| 7,934,263 B2* | 4/2011 | Singer et al. | 726/26 |
| 2006/0174240 A1* | 8/2006 | Flynn | 717/170 |
| 2008/0104401 A1* | 5/2008 | Miyamoto et al. | 713/175 |

* cited by examiner

ELECTRONIC DEVICE AND METHOD OF SOFTWARE OR FIRMWARE UPDATING OF AN ELECTRONIC DEVICE

BACKGROUND

1. Technical Field

The present invention relates to an electronic device as well as to a method for software or firmware updating of an electronic device.

2. Description of the Related Art

Modern electronic devices typically comprise some hardware components, wherein at least some of the hardware components are programmable by means of software. The software or firmware for the operation of the electronic device can be updated, for example, in order to improve the operation or the security of the device. However, when the software or firmware of an electronic device is updated, it is desirable that the new software or firmware is of a more recent version than the currently stored software or firmware. The technique to avoid updating currently stored software or firmware with an older version is called anti-rollback. An anti-rollback scheme is advantageous to protect content, i.e., if a vulnerability in the software or firmware is found, such a vulnerability can be avoided by a new software or a new firmware dealing with the vulnerability. Furthermore, by means of an update of the software or firmware, the security of an electronic device can be improved. Therefore, users can be protected from malicious attacks. For example, if a firmware rollback is applied to an electronic device, user secrets like payment password, identity data, and the like, which is stored in the device, may be retrieved from the device by using a firmware previously present.

A software or firmware update can, for example, also be performed wirelessly over the air, i.e., a firmware over-the-air (FOTA) can be performed.

An anti-rollback of a firmware or software is typically achieved based on a clock and a validity period associated to each software or firmware version. The clock may be implemented as hardware or software and the software will stop the clock as soon as the validity period has expired. However, here, the validity period has to be defined or determined. On the other hand, if a problem is discovered in the firmware or software, it should be updated regardless of whether the validity period has expired or not.

Alternatively, the anti-rollback technique can be applied when an update of a software or firmware is performed. This anti-rollback technique is used to control the integrity of the software, for example, by means of internal cryptographic keys. Therefore, hardware associated thereto will perform the integrity check of the software or firmware when the device is booted. The hardware will only perform the update with the new software or firmware if the version number of the new software or firmware is higher than that of the current software. Furthermore, the hardware can use internal keys to update the integrity check value. However, it should be noted that here, the anti-rollback is tightly coupled to the hardware controlled integrity and secret cryptographic keys.

GB 2430774 B discloses a method of software updating and a corresponding processor unit. Here, an anti-rollback system is provided which is based on version numbers. Therefore, the version numbers can be stored securely. The disadvantage of such a solution is the costs required for the hardware will depend on the software numbering.

GB 2425193 A discloses an anti-rollback system based on version numbers. A one-time write memory element is provided to achieve a functionality of a bit-by-bit analysis, wherein the bit will depend on the version number of the software. In particular, one way to bind the version of the installed software to the hardware of the electronic device is to use a special numbering of the software. Accordingly, one bit per existing software version is needed.

BRIEF SUMMARY

The present disclosure describes an embodiment of an electronic device and a method for updating a software or firmware in the electronic device which is cheaper to implement.

Therefore, an electronic device is provided which comprises a memory driver unit for reading partition headers including encrypted version numbers from a memory and for writing updated encrypted version numbers to the memory. The electronic device furthermore comprises an update agent unit for controlling a software or firmware update of the electronic device as well as a one-time programmable memory for storing a first value, and an encrypt-decrypt unit for decrypting the partition headers stored in the memory based on the first value stored in the one-time programmable memory in order to retrieve version numbers of the partition headers. The update agent is adapted to compare the retrieved version numbers with a version number from a software or firmware update in order to determine whether the version number of the software or firmware update is larger than the retrieved version numbers. The first value is incremented and stored in the one-time programmable memory if an update is performed. The encrypt-decrypt unit is adapted to encrypt the version numbers of the software or firmware update based on the new first value. The memory driver unit is adapted to write a new partition header with the updated encrypted version numbers into the memory.

According to an embodiment, the software or firmware of the electronic comprises at least two components, wherein each component can have its own version number and which can be updated separately.

According to an aspect discussed in the present disclosure, the update of the first value can be deactivated. Hence, the anti-rollback scheme may be activated when desired.

The present disclosure also relates to a method of software or firmware updating of an electronic device. Partition headers including encrypted version numbers are read from a memory. A software or firmware update of the electronic device is performed. A first value is stored in a one-time programmable memory. The partition headers stored in the memory are decrypted based on the first value stored in the one-time programmable memory OTP to retrieve the encrypted version numbers of the partition headers. The retrieved version numbers are compared with a version number of a software or firmware update in order to determine whether the version number of the software or firmware update is larger than the retrieved version number. The first value in the one-time programmable memory OTP is incremented and stored if an update is performed. The version numbers of the software or firmware update are encrypted based on the new first value. A new partition header with the updated encrypted version numbers is written into the memory.

The present disclosure relates to the idea to provide a possibility of an anti-rollback scheme. Therefore, a one-time programmable memory is provided. The memory is at least as long as the maximum possible version numbers. However, it should be noted that it cannot be predicted how many version numbers of software or firmware will be available during the lifetime of an electronic device.

It should be noted that in modern electronic devices, the required software or hardware for the operation of the electronic devices may be divided into a plurality of partitions, wherein each partition could be updated independently of the other partitions of the software or firmware. Accordingly, if one bit is used for every existing software version, the required amount of bits may be very high which will lead to a very high cost of the electronic device.

Furthermore, typically the software as well as the firmware can be divided into separate components which may be updated independently of each other. By means discussed in the present disclosure, the number of bits which are required to store the version number is not dependent on the version number. To avoid a tampering of the version number, some kind of memory is provided which is tamper-proof. Furthermore, some means of encrypting is provided for linking a state of the programmable memory (a value stored in the one-time programmable memory) with the actual version number of the software or firmware stored in a memory of the electronic device.

The present disclosure also relates to the idea to use a monotonous counter (memory register preferably accessible only by the anti-rollback mechanism or a one-time programmable memory; each bit which is set cannot be modified any further) in an embodiment. Furthermore, a cryptographic hardware component is used which can encrypt and decrypt signs using a symmetric cryptographic mechanism with an unknown key which can be different for each electronic device. Accordingly, when an update or upgrade of the software or firmware is performed, a value in the one-time programmable memory OTP is incremented and the new OTP register value is linked to the software or firmware version numbers by means of an internal cryptographic hardware component. Accordingly, a software version is bound to the electronic device by means of a single bit.

When a firmware or software is to be updated wirelessly, a software or firmware update may be performed without having to interact with the hardware. The new software or hardware version can be downloaded while the device is operating. An update may be performed by means of a software update agent. The integrity of the update can be implemented by a public-key cryptographic mechanism. Then the current software or firmware image can be discarded and the new software or firmware is used. However, it should be noted that a rolling back to the discarded image can be performed by merely uploading the dumped image to the device again.

According to another embodiment, an electronic device includes a memory having a first partition and a second partition. The first and second partitions are configured to store first and second components respectively, the first and second partitions have first and second partition headers respectively, and the first and second partition header have encrypted first and second version numbers respectively, wherein the first and second version numbers correspond to the first and second stored components. The electronic device includes a one-time programmable memory adapted to store a first value and a memory driver unit adapted to read the first partition header from the memory and write an updated first partition header to the memory, wherein the updated first partition header has an updated encrypted version number. The electronic device further includes an encrypt-decrypt unit and an update agent unit. The encrypt-decrypt unit is adapted to retrieve the first version number of the first partition header by decrypting the first partition header based on the first value, and the encrypt-decrypt unit is further adapted to create an updated first partition header by encrypting an updated first version number corresponding to an updated first component based on an updated first value. The update agent unit is adapted to compare the retrieved first version number with the updated first version number to determine whether the updated first version number represents that the updated first component is a later version of the stored first component. If the updated first component is a later version of the stored first component, the update agent unit is further adapted to generate the updated first value and direct storage of the updated first value in the one-time programmable memory.

According to an embodiment, the memory driver unit, the encrypt-decrypt unit, and the update agent unit are adapted to store an updated second component.

According to an embodiment, the memory driver unit, the encrypt-decrypt unit, and the update agent unit are adapted to store an updated second partition header even if the stored second component is not updated.

According to an embodiment, the updated first value represents the first value having one additional bit asserted.

According to an embodiment, the updated first value represents the first value incremented by one.

According to an embodiment, the encrypt-decrypt unit is further adapted to retrieve first data when the first partition header is decrypted.

According to an embodiment, the first data represents a public key.

According to an embodiment, the encrypt-decrypt unit is adapted to retrieve a copy of the first value when the first partition header is decrypted and wherein the update agent unit is adapted to compare the first value with the copy of the first value.

According to an embodiment, the update agent unit is adapted to direct a reboot of the electronic device if the first value is not the same as the copy of the first value.

According to an embodiment, during boot of the electronic device, the memory driver unit is configured to retrieve an unencrypted copy of the first version number, the encrypt-decrypt unit is adapted to retrieve the first version number, and the update agent unit is adapted to take an action if the copy of the first version number is different than the first version number.

According to an embodiment, the memory driver unit, the encrypt-decrypt unit, and the update agent unit are parts of a set top box.

According to an embodiment, the memory driver unit, the encrypt-decrypt unit, and the update agent unit are parts of a mobile device.

BRIEF DESCRIPTION OF THE SEVERAL VIEWS OF THE DRAWINGS

Advantages and embodiments discussed in the present disclosure will now be described in more detail with reference to the Figures.

Non-limiting and non-exhaustive embodiments are described with reference to the following drawings, wherein identical or analogous components or modules are indicated with the same reference numbers throughout the various views unless otherwise specified or the context indicates otherwise. The relative positions of elements in the drawings are not necessarily drawn to scale. For example, the various elements may be connected as illustrated, connected in other ways, and connected with other intervening elements. Some elements in the illustrations include electronic hardware, software, and cooperative combinations of electronic hardware and software. The particular elements of the figures have been selected for ease of recognition in the drawings. One or more embodiments are described hereinafter with reference to the accompanying drawings in which.

DETAILED DESCRIPTION

In the embodiments, it is assumed that the software or firmware of an electronic device can be organized in several components each having their own version number. Accordingly, each component of the software or firmware with its own version number can be updated separately or independently. An encrypted version number can be stored in a flash memory together with the software or firmware. A one-time programmable memory can be used to store a counter which is incremented when an update is performed. This memory can also be implemented as a one-time programmable memory OTP register which can be initialized by setting all bits to zero at the first use. Furthermore, an Encrypt and Decrypt function can be provided. These Encrypt and Decrypt functions can for example be implemented by the advanced encryption standard FIPS 197 in the cipher block chaining mode with a 128-bit key embedded in the device. In an embodiment, this key is only used for the Encrypt and Decrypt functions.

The Encrypt and Decrypt functions can be used to combine a state of the one-time programmable memory field with a version number of each component of the software or firmware in connection with further data related to the software component or firmware component. Accordingly, a value can be achieved which enables an integrity check, for example, based on a public key signature, a hash footprint, or the like.

Figure 1:
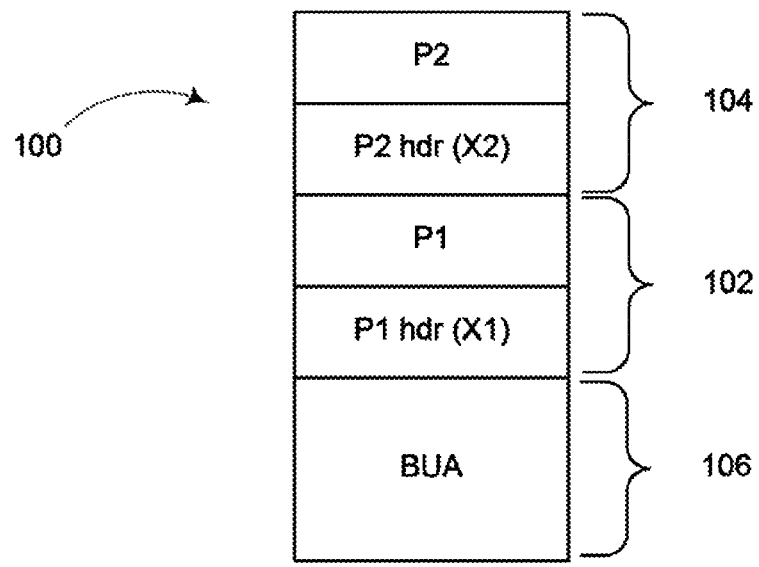
FIG. 1 shows a representation of a flash memory according to a first embodiment.

FIG. 1 shows a representation of a memory 100 in an electronic device according to a first embodiment. The memory can be implemented as a flash memory and comprises at least a first and second partition P1, P2 102, 104. Each partition contains a partition header P1$hdr$, P2$hdr$. Each partition has its own version number $v_c$ (v1, v2). Each of the partition headers comprises an encrypted version number $X_c$(X1, X2) which is linked to data comprising the version number $v_c$ (v1, v2). In the memory furthermore, a boot and update agent BUA 106 and the corresponding software or firmware is stored. The boot and update agent BUA may be protected by hardware means (encrypt-decrypt unit).

Figure 2:
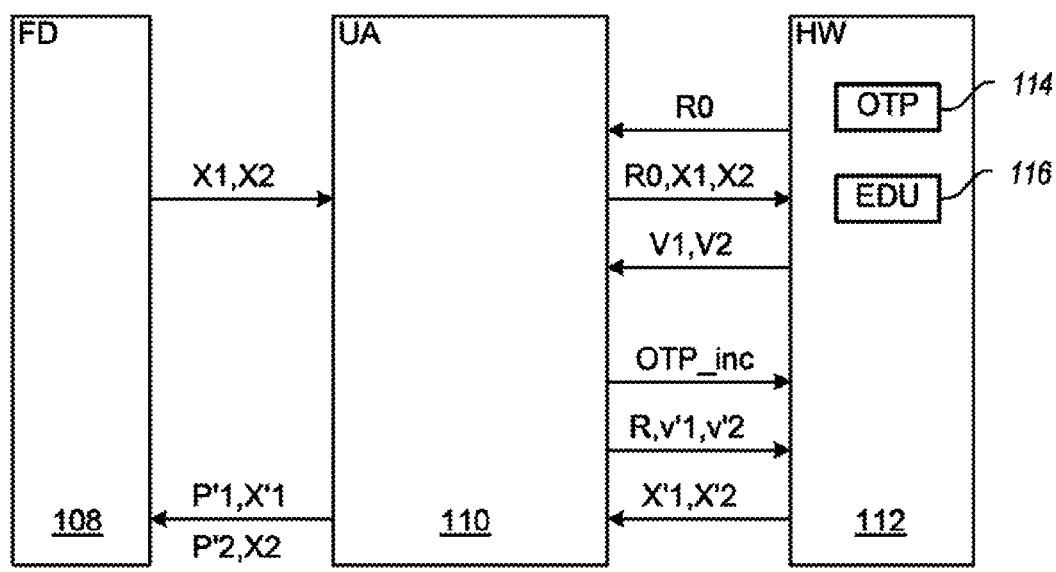
FIG. 2 shows a block diagram of part of an electronic device according to a first embodiment.

FIG. 2 shows a block diagram of part of an electronic device according to a first embodiment. The electronic device comprises a flash driver FD 108 for driving a memory, an update agent unit UA 110, and a hardware unit HW 112, which may comprise a one-time programmable memory OTP 114 and an encrypt-decrypt unit EDU 116. When the said electronic device is produced, a dedicated field in a one-time programmable memory OTP 114 is available with no bit set, i.e., all its bits are 0. A one-time programmable memory is one-time programmable, i.e., it preferably can never be "reset".

Figure 3:
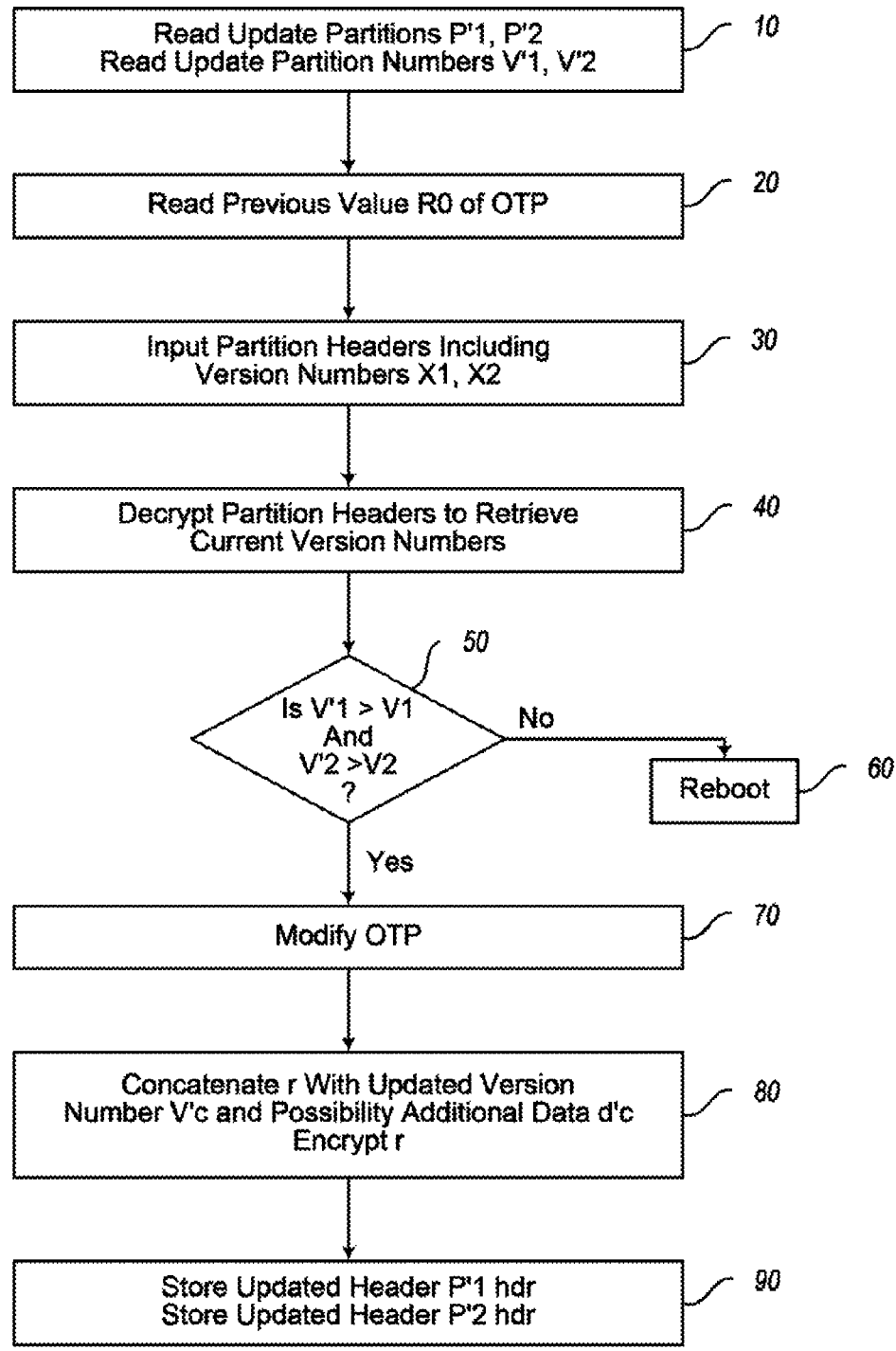
FIG. 3 shows a flow chart of a method for updating an electronic device according to the first embodiment.

FIG. 3 shows a flow chart of a method of updating the software or firmware of an electronic device according to a first embodiment. The update may be performed by the electronic device according to FIG. 2. Then, a download of a new software or new firmware can be performed to the device.

During the production of the electronic device, the partition headers are created for each partition C. This can be done by a special behavior of the first-time boot, or using special software loaded into the device memory and executed. During this process, the value $X_c$=Encrypt (0||version number of C||additional data possibly related to C) is computed for each software component C and is stored. "||" denotes concatenation. The "0" value corresponds to the initial state of the said dedicated OTP field, read as a binary value. The Encrypt function uses the key embedded in the device as the encryption key.

During an update, the encrypted version numbers $X_c$ are used to decide whether the update should be performed, and, if so, the numbers $X_c$ and, if necessary, the OTP field, are modified. In step 10, the update agent unit UA reads the update partitions P'1, P'2 and the update partition numbers v'1, v'2 of the update of the software or the firmware. In step 20, the update agent unit UA reads the previous value R0 of the one-time programmable memory OTP. In step 30, the partition headers including the encrypted version numbers X1, X2 of the currently stored software or firmware are inputted from a flash driver FD (as extracted from the flash memory) to the updated agent unit UA. In step 40, the partition headers with the encrypted version numbers $X_c$ are decrypted by means of the encrypt-decrypt unit EDU based on the said key embedded in the device. For each partition C, the result of the operation is "r0||$v_c$||$d_c$". It is checked that the value "r0" is equal to the value "R0" read from the dedicated field in OTP memory. If it is not true, then the device is rebooted. The current version numbers v1, v2 of the update of the software or firmware are thus retrieved.

In step 50, it is determined whether the updated version number v'1 is larger than the (decrypted) version number v1 as stored in the flash memory and that the updated version number v'2 is larger than the (decrypted) version number v2 in the flash memory.

In step 60, it has been determined that an updated version number is not larger (or later) than a stored version number so the electronic device is rebooted.

In step 70, the dedicated field in the one-time programmable memory OTP is modified by setting, for instance, one additional bit, to obtain a new (current) value R. In step 80, the value r0 is updated to r which is equal to R. For each partition C, r is concatenated with the updated version number $v'_c$ (v'1, v'2) and, possibly, additional data $d'_c$ related to C to form the string "r||$v'_c$||$d'_c$". This string is encrypted with the said key embedded in the device and the updated encrypted version numbers X'1, X'2 are obtained. In step 90, the partition P'1 with the updated header P'1$hdr$ containing X'1 is stored and the partition P'2 with the updated header P'2$hdr$ containing X'2 is stored.

Independently from the update process described herein, during a normal boot execution, an anti-rollback process can be performed that is based on the encrypted version numbers $X_c$. This process includes computing a decryption of the encrypted version number $X_c$ in order to retrieve strings of the form "r||$v_c$||$d_c$". It is then determined whether the value "r" is equal to the current value R of the one-time programmable memory. In an embodiment, the partition header $P_c$hdr contains both the version number $v_c$ and the encrypted version number $X_c$. In this case, it is also determined whether the version number of the software component corresponds to the decrypted version number $v_c$. The additional data $d_c$ can relate to an integrity-related value like a public key signature of the software component. Furthermore, it is verified whether the validity of the signature corresponds to that of the software component.

Accordingly, to implement anti-rollback, the following algorithm is performed at boot in addition to normal boot execution:

For each protected software component C compute Decrypt($X_c$) to retrieve an associated OTP value r, the version number $v_c$ and additional data $d_c$;

check that r is equal to the current OTP value;
    check that the version number of C is equal to $v_c$.

When the update agent unit UA performs an update, the one-time programmable memory OTP is incremented (i.e., it burns one more bit). The update agent unit UA can update the values $X_c$ of the encrypted version numbers for all components C regardless of whether they are updated. Hence, the version numbers of those components C that do not change are kept by the following algorithm:

compute Decrypt($X_c$) to retrieve an associated OTP value R, the version number $v_c$, and additional data $d_c$;
    if R is equal to R0, replace $X_c$ with Encrypt(R||$v_c$||$d_c$).

However, for every component C that is updated, the following algorithm can be performed:

compute Decrypt($X_c$) to retrieve an associated OTP value R, the version number $v_c$ and additional data $d_c$;
    Check whether R=R0;
    Read the component new version number $v'_C$ and additional data $d'_C$ from the update package;
    Check that $v'_C$ is at least equal to $v_c$;
    Compute $X'_c$=Encrypt(R||$v'_c$||$d'_c$;
    Replace $X_c$ with $X'_c$.

According to a further embodiment, it is specified when an update shall not be rolled back. Here, it is specified for each software component update, whether it requires an anti-rollback function from the previous version or not. If no anti-rollback function is required the update agent unit UA can bypass the increment of the one-time programmable memory OTP.

According to still a further embodiment, a dependency tree of an anti-rollback function is provided and can be used to specify, for each software component C, which version transitions require anti-rollback. This dependency tree can be provided as a software component itself that does not require anti-rollback, and it can be updated by the update agent unit UA before any anti-rollback-related processing. Then, during an update, the update agent UA can refer to the updated tree before any of the components C are updated. Furthermore, it can check whether at least one transition requires anti-rollback or not. Depending on the result, it can perform an increment of the OTP register, or it can bypass the increment.

The anti-rollback mechanism prevents the rollback based on the software memory dump technique described herein. In some embodiments, only one OTP register is implemented regardless of the number of versioned software components. The size of the OTP depends on the number of updates that a user is likely to perform, which is usually far less than the total number of existing software updates in the lifetime of the product. For instance, if there are two pieces of software that the user upgrades respectively from version 2.0 to 2.15 and 3.1 to 3.9, the cost of implementing rollback will be one OTP bit only (instead of 23).

According to embodiments in the present disclosure, one bit is implemented for an update of the one-time programmable memory. In the one-time programmable memory, a value $R_0$ is stored. This value is linked to the version number of the software or firmware currently stored on the electronic device. When an update of the software or firmware is performed and the anti-rollback scheme according to the present disclosure is activated, the value of $R_0$ is incremented (by one) to a value R. Accordingly, a counter is implemented.

In other words, the one-time programmable memory is not used to store the actual version numbers, but it is merely used to store the value of a counter, wherein this value may correspond to the number of updates of the software and firmware which have been performed.

The updated or incremented value R is stored in the one-time programmable memory OTP. This value can be used as a basis for encrypting the version number of the updated software and firmware. The encrypted version number is then stored together with the updated software or firmware.

The new version of the updated counter is used to encrypt the version numbers of those parts of the software or firmware which have been updated. Alternatively, or in addition, the version numbers of those parts of the software or firmware which have not been updated are also encrypted based on the value of the one-time programmable memory OTP.

Therefore, the encrypted version numbers of the software are also stored, for example, in a flash memory together with the software or firmware. It should be noted that if the content of the flash memory has been tampered with, then the encrypted version numbers of the software or firmware stored in the flash memory will indicate that.

Tampering can be determined when those encrypted version numbers stored in the memory are decrypted based on the actual value of the one-time programmable memory and when the version number of the updated software or firmware is compared to the decrypted version number stored in the memory. When the encrypted version numbers are decrypted, and when the flash memory has been tampered with, the associated value in the result of the decryption of the encrypted version number will not correspond to the value as stored in the one-time programmable memory. Hence, it can be determined that the content of the flash memory has been tampered with.

The anti-rollback scheme according to the present disclosure can be used in mobile platforms, Set-Top Boxes and car devices. The anti-rollback scheme according to the present disclosure can also be used in any electronic device (like PCs) which can update the firmware "online" (not necessarily "over-the-air").

It should be noted that the above-mentioned embodiments are illustrative rather than limiting, and that those skilled in the art will be able to design many alternative embodiments without departing from the scope of the disclosure. The word "comprising" does not exclude the presence of elements or steps other than those listed in a claim. The word "a" or "an" preceding an element does not exclude the presence of a plurality of such elements. In the device claims enumerating several means, several of these means can be embodied by one and the same item of hardware. The mere fact that certain measures are recited in mutually different dependent claims does not indicate that a combination of these measures cannot be used to advantage.

Some embodiments may take the form of or comprise computer program products. For example, according to one embodiment there is provided a computer readable medium comprising a computer program adapted to perform one or more of the methods or functions described above. The medium may be a non-transitory medium such as a physical storage medium, for example, a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., programmed by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device, comprising:
   a memory driver unit configured to read partition headers having encrypted version numbers from a memory and configured to write an updated encrypted version numbers to the memory;
   an update agent unit configured to control a software or firmware update of the electronic device;
   a one-time programmable memory configured to store a first value; and
   an encrypt-decrypt unit configured to decrypt the partition headers stored in the memory based on the first value stored in the one-time programmable memory, the encrypt-decrypt unit configured to retrieve version numbers from the partition headers;
      wherein the update agent unit is configured to compare the retrieved version numbers with version numbers from a software or firmware update to determine whether the version numbers of the software or firmware update are larger than the retrieved version numbers,
      wherein the first value is incremented and stored in the one-time programmable memory if an update is performed; wherein the encrypt-decrypt unit is configured to encrypt the version numbers of the software or firmware update based on the new first value; and
      wherein the memory driver unit is configured to write new partition headers with updated encrypted version numbers into the memory.

2. The electronic device according to claim 1, wherein the software or firmware of the electronic comprises at least two components, wherein each component can have its own version number, and wherein each component can be updated separately.

3. The electronic device according to claim 1, wherein the update of the first value can be deactivated.

4. A method, comprising:
   updating software or firmware of an electronic device, the updating performed by the electronic device and including:
      reading a partition header including an encrypted version number from a memory; controlling a software or firmware update of the electronic device;
      storing a first value in a one-time programmable memory;
      decrypting the partition header stored in the memory based on the first value stored in the one-time programmable memory, the decrypting to retrieve the encrypted version number of the partition header;
      comparing the retrieved version number with a version number of a software or firmware update in order to determine whether the version number of the software or firmware update is larger than the retrieved version number;
      incrementing and storing the first value in the one-time programmable memory if an update is performed;
      encrypting the version number of the software or firmware update based on the new first value; and
      writing a new partition header with the updated encrypted version number into the memory.

5. The method according to claim 4, wherein the updating comprises:
   reading a second partition header including a second encrypted version number from the memory;
   decrypting the second partition header based on the first value, the decrypting to retrieve the second encrypted version number;
   comparing the retrieved second version number with a second version number of the software or firmware update in order to determine whether the second version number of the software or firmware update is larger than the retrieved second version number,
   encrypting the second version number of the software or firmware update based on the new first value,
   writing a new second partition header with the updated encrypted second version number into the memory.

6. The method according to claim 4, wherein the updating includes:
   encrypting a second version number based on the new first value if the software or firmware update does not direct an update to a second partition;
   writing a new second partition header with the encrypted second version number into the memory.

7. The method according to claim 4, wherein the updating includes:
   creating a dependency tree to map multiple software or firmware updates.

8. The method according to claim 4, wherein the updating includes:
   encrypting the incremented first value together with the version number of the software or firmware update.

9. An electronic device, comprising:
   a memory having a first partition and a second partition, the first and second partitions configured to store first and second components respectively, the first and second partitions having first and second partition headers respectively, and the first and second partition header having encrypted first and second version numbers respectively, the first and second version numbers corresponding to the first and second stored components;
   a one-time programmable memory configured to store a first value;
   a memory driver unit configured to read the first partition header from the memory and write an updated first partition header to the memory, the updated first partition header having an updated encrypted version number;
   an encrypt-decrypt unit configured to retrieve the first version number of the first partition header by decrypting the first partition header based on the first value, the encrypt-decrypt unit configured to create an updated first partition header by encrypting an updated first version number corresponding to an updated first component based on an updated first value; and an update agent unit configured to compare the retrieved first version number with the updated first version number to determine whether the updated first version number represents that the updated first component is a later version of the stored first component, and, if the updated first component is a later version of the stored first component, the update agent unit is configured to generate the updated first value and direct storage of the updated first value in the one-time programmable memory.

10. The electronic device according to claim 9, wherein the memory driver unit, the encrypt-decrypt unit, and the update agent unit are configured to store an updated second component.

11. The electronic device according to claim 10, wherein the memory driver unit, the encrypt-decrypt unit, and the update agent unit are configured to store an updated second partition header even if the stored second component is not updated.

12. The electronic device according to claim 9, wherein the updated first value represents the first value having one additional bit asserted.

13. The electronic device according to claim 9, wherein the updated first value represents the first value incremented by one.

14. The electronic device according to claim 9, wherein the encrypt-decrypt unit is configured to retrieve first data when the first partition header is decrypted.

15. The electronic device according to claim 14, wherein the first data represents a public key.

16. The electronic device according to claim 9, wherein the encrypt-decrypt unit is configured to retrieve a copy of the first value when the first partition header is decrypted and wherein the update agent unit is configured to compare the first value with the copy of the first value.

17. The electronic device according to claim 16, wherein the update agent unit is configured to direct a reboot of the electronic device if the first value is not the same as the copy of the first value.

18. The electronic device according to claim 9, wherein, during boot of the electronic device, the memory driver unit is configured to retrieve an unencrypted copy of the first version number, the encrypt-decrypt unit is configured to retrieve the first version number, and the update agent unit is configured to take an action if the copy of the first version number is different than the first version number.

19. The electronic device according to claim 9, wherein the memory driver unit, the encrypt-decrypt unit, and the update agent unit are parts of a set top box.

20. The electronic device according to claim 9, wherein the memory driver unit, the encrypt-decrypt unit, and the update agent unit are parts of a mobile device.

* * * * *